United States Patent [19]
Chyan-Luen

[11] Patent Number: 6,010,173
[45] Date of Patent: Jan. 4, 2000

[54] SUNSHIELD FOR MOTORCYCLES

[76] Inventor: Jow Chyan-Luen, P.O. Box 82-144, Taipei, Taiwan

[21] Appl. No.: 09/178,553

[22] Filed: Oct. 26, 1998

[51] Int. Cl.$^7$ .................................. B62J 17/08; B60J 7/08
[52] U.S. Cl. .............................................. 296/78.1; 296/98
[58] Field of Search .............................. 296/78.1, 98, 211

[56] References Cited

U.S. PATENT DOCUMENTS 5,458,390  10/1995  Gilbert .................................... 296/78.1

FOREIGN PATENT DOCUMENTS

| | | | |
|---|---|---|---|
| 1189433 | 3/1959 | France .................................... | 296/78.1 |
| 2501208 | 7/1976 | Germany .............................. | 296/78.1 |
| 479484 | 3/1953 | Italy ...................................... | 296/78.1 |
| 612636 | 8/1979 | Switzerland ........................... | 296/78.1 |

*Primary Examiner*—D. Glenn Dayoan
*Assistant Examiner*—Paul Chenevert
*Attorney, Agent, or Firm*—Dougherty & Troxell

[57] ABSTRACT

A sunshield for motorcycles generally includes a pair of front brackets mounted on the head portion of a motorcycle, a pair of rear brackets installed on the tail portion of the motorcycle, a pair of reel supporting brackets fixedly mounted on the rear brackets, a reel installed on the reel supporting brackets and provided with a piece of canvas, a frame arranged between the front and rear brackets, and a transparent windshield fixedly mounted on an upper portion of the front brackets, whereby the canvas can be pulled out of the reel to engage with upper ends of the front brackets to protect a rider of a motorcycle from strong wind, direct sunlight and rain. Furthermore, a lamp is mounted on the rear side of the reel to act as a braking and direction indicating light. In addition, a solar energy collecting panel is arranged on the reel to convert solar energy into electric power. Moreover, the sunshield can be easily assembled without paying someone else to do it.

7 Claims, 11 Drawing Sheets

SUNSHIELD FOR MOTORCYCLES

BACKGROUND OF THE INVENTION

1. Field of the Invention

This invention is related to a sunshield for motorcycles and in particular to one which can protect the rider of a motorcycle from direct sunlight and rain.

2. Description of the Prior Art

It has been found that the conventional sunshield for motorcycles is integrally formed with the body portion of a motorcycle. Hence, once the motorcycle is subjected to vigorous vibration, the sunshield will be easily broken. In addition, such a sunshield is only designed for blocking off sunlight and cannot protect the rider of a motorcycle from heavy rain.

Therefore, it is an object of the present invention to provide an improved sunshield for motorcycles which can obviate and mitigate the above-mentioned drawbacks.

SUMMARY OF THE INVENTION

This invention is related to a sunshield for motorcycles.

According to a preferred embodiment of the present invention, a sunshield for motorcycles generally includes a pair of front brackets mounted on the head portion of a motorcycle, a pair of rear brackets installed on the tail portion of the motorcycle, a pair of reel supporting brackets fixedly mounted on the rear brackets, a reel installed on the reel supporting brackets and provided with a piece of canvas, a frame arranged between the front and rear brackets, and a transparent windshield fixedly mounted on an upper portion of the front brackets.

It is the primary object of the present invention to provide a sunshield for motorcycles which can protect the rider of a motorcycle from strong wind, direct sunlight and rain.

It is another object of the present invention to provide a sunshield for motorcycles which can be easily assembled without paying someone else to do it.

It is still another object of the present invention to provide a sunshield for motorcycles which has a board for advertising a product, service, or the like.

It is still another object of the present invention to provide a sunshield for motorcycles which has a braking and direction indicating lamp.

It is a further object of the present invention to provide a sunshield for motorcycles which can be adapted for use with a covering board.

The invention is naturally not limited in any sense to the particular features specified in the foregoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

DETAILED DESCRIPTION OF THE PREFERRED EMBODIMENT

Figure 1:
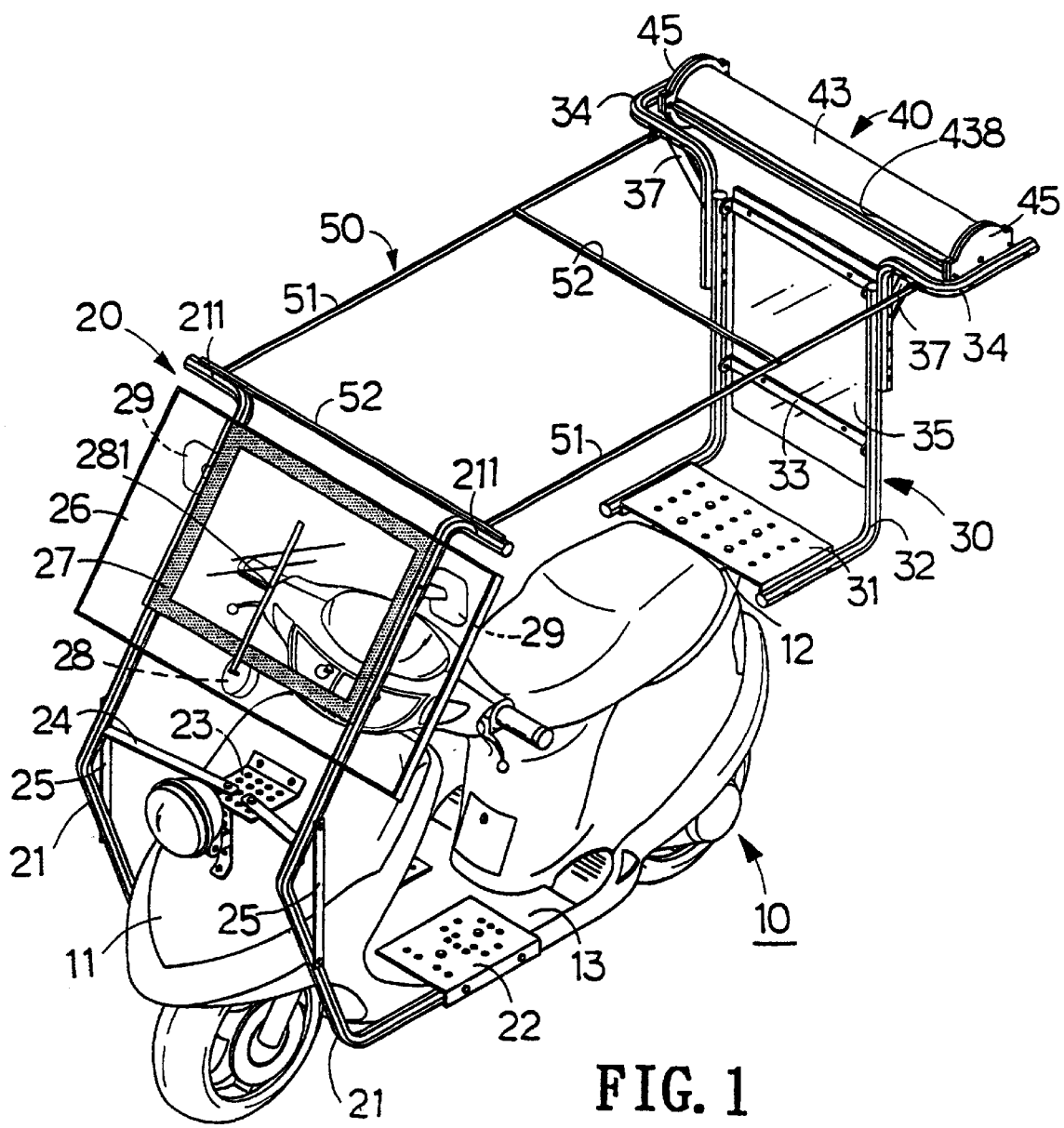
FIG. 1 is a perspective view of the present invention.

With reference to the drawings and in particular to FIG. 1 thereof, the sunshield for motorcycles according to the present invention generally comprises a pair of front brackets 20 mounted on two sides of the front portion 11 of a scooter 10, a pair of rear brackets 30 mounted on the rear portion 12 of the scooter 10, a pair of reel supporting brackets 34 fixedly mounted on the rear brackets 30, a reel 40 installed on the reel supporting brackets 34 and provided with a piece of canvas 41 (see FIG. 3), and a frame 50 arranged between the front and rear brackets 20 and 30 and composed of two longitudinal rods 51 and two transverse rods 52.

Each of the front brackets 20 includes two main rods 21, two base members 22 for fixing the lower end of the main rods 21, an adjusting plate 23 fixedly mounted on the front portion 11 of the scooter 10, two transverse rods 24 for connecting the two main rods 21 to the adjusting plate 23, and two reinforcing rods 25 fixedly mounted on the two main rods 21 for strengthening the main rods 21. On the upper portions of the two main rods 21 are fixedly mounted a transparent windshield 26 on which, in turn, is mounted a piece of reinforced glass 27 for reinforcing the strength of the windshield 26. A windshield wiper 281 is arranged on the outer side of the windshield 26. A motor 28 is mounted on the inner side of the windshield 26 and drivingly connected with the windshield wiper 281. The two main rods 21 are each provided with a rearview mirror 29 at appropriate positions. The upper ends of the two main rods 21 are bent into horizontal rods 211 for hanging the canvas 41. The adjusting plate 23 is formed with a plurality of perforations for adjusting the positions of the transverse rods 24. The base members 22 are also formed with a plurality of perforations adapted to engage with bolts so as to fix the base members 22 on the base 13 of the scooter 10. In addition, the lower ends of the main rods 21 are fixed by the base members 22.

The rear brackets 30 includes a board 31 fixedly mounted on the rear portion 12 of the scooter 10, two L-shaped rods 32 fixedly mounted on the board 31, and a plurality of transverse rods 33 mounted between the two L-shaped rods 32. The board 31 is formed with a plurality of perforations so that the board 31 can be mounted on tail portions 2 with different sizes by bolts.

The upper ends of the L-shaped rods 32 are fixedly connected with the lower ends of the reel supporting brackets 34. The upper ends of the reel supporting brackets 34 are bent into horizontal rods for engaging with two ends of the reel 40. The corners of the reel supporting brackets 34 are each provided with an auxiliary rod 37 for reinforcing the structure thereof.

Figure 2:
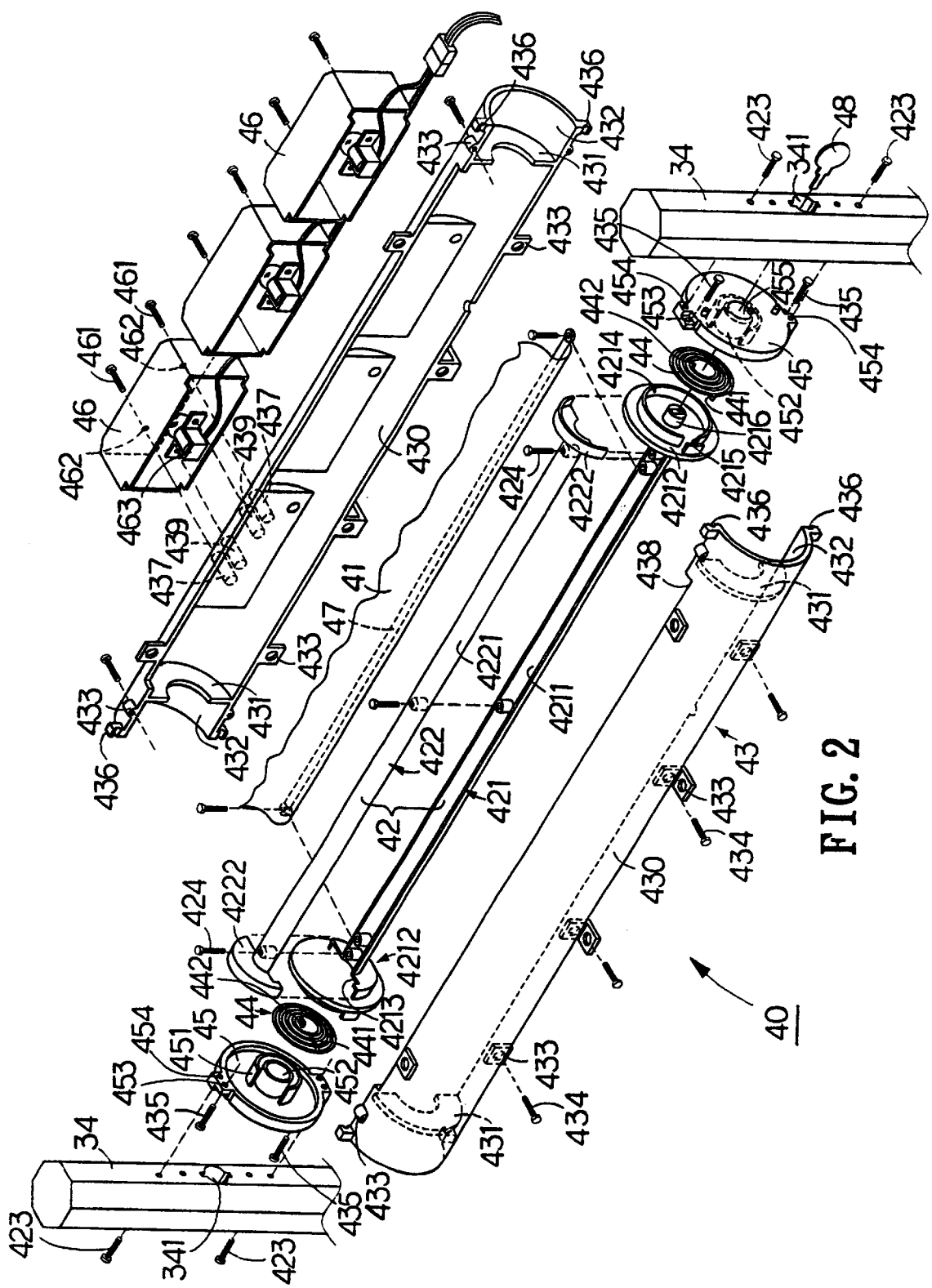
FIG. 2 is an exploded view of the reel.

FIG. 2 is a perspective view of the reel. As shown, the reel 40 includes a housing 43, an axle 42 disposed within the housing 43, a positioning rod 47 fitted within the axle 42, a piece of canvas 41 having an edge fastened on the positioning rod 4, two spiral springs 44 mounted on two ends of the axle 42, two caps 45 mounted on two ends of the housing 43, and three lamp hoods 46 arranged on the outer side of the housing 43.

The axle 42 is composed of a primary portion 421 and a secondary portion 422. The primary portion 421 includes a half tubular member 4211 and two circular members 4212 mounted on two ends of the half tubular member 4211. The secondary portion 422 includes a half tubular member 4221 and two semi-circular members 4222 mounted on two ends of the half tubular member 4221. The primary portion 421 and secondary portion 422 are bolted together, with the half tubular members 4211 and 4221 joined together to form a tubular shaft 42 and the semi-circular members 4222 fitted in semi-circular recesses 4213. The positioning rod 47 is fixedly mounted within the tubular shaft 42 composed of the half tubular members 4211 and 4221 by bolts 424. The positioning rod 47 is fixedly connected with an edge of the canvas 41 so that the canvas 41 may be rolled up on the tubular shaft 42.

The circular member 4212 is formed at the outer side with a recess 4214 in which is fitted the spiral spring 44 having a hooked outer end 441 engaged with a notch 4215 of the circular member 4212 and a hooked inner end 442 engaged with a notch of a C-shaped member at the inner side of the cap 45. The circular member 4212 has an axle 4216 pivotally fitted in a tubular portion 452 at the inner side of the cap 45, so that the axle 42 can be rotated through an angle of 360 degrees.

The housing 43 is composed of two semi-cylindrical members 430 each having a partition 431 close to both ends thereof to form two chambers 432 for receiving the circular members 4212 thereby enabling the tubular shaft 42 to rotate through an angle of 360 degrees. The two semi-cylindrical members 430 are joined together by aligning the projections 433 and then turning bolts therethrough. The housing 43 is engaged with the cap 45 by bolts 435 extending through holes 453 of the cap 45 and threaded holes 436 at two ends of the housing 43. The lamp hoods 46 are secured to the housing 43 by two bolts 461 extending through holes 462 into tubular members 437 of the housing 43. Electrical sockets 463 are mounted on the housing 43 by extending bolts through the holes of the electrical sockets 463 into the tubular members 439 of the housing 43.

The reel 40 is fixedly mounted on the reel supporting brackets 34 by extending bolts 423 through the upper ends of the reel supporting brackets 34 into threaded holes 454 of the caps 45.

The upper end of the reel supporting bracket 34 is formed with an opening 341 so that a fixing rod 48 can be inserted through the center hole 455 of the cap 45 into the square hole 4216 of the axle 42, so that the axle 42 will be fixed in position thereby keeping the position of the canvas 41.

Figure 3:
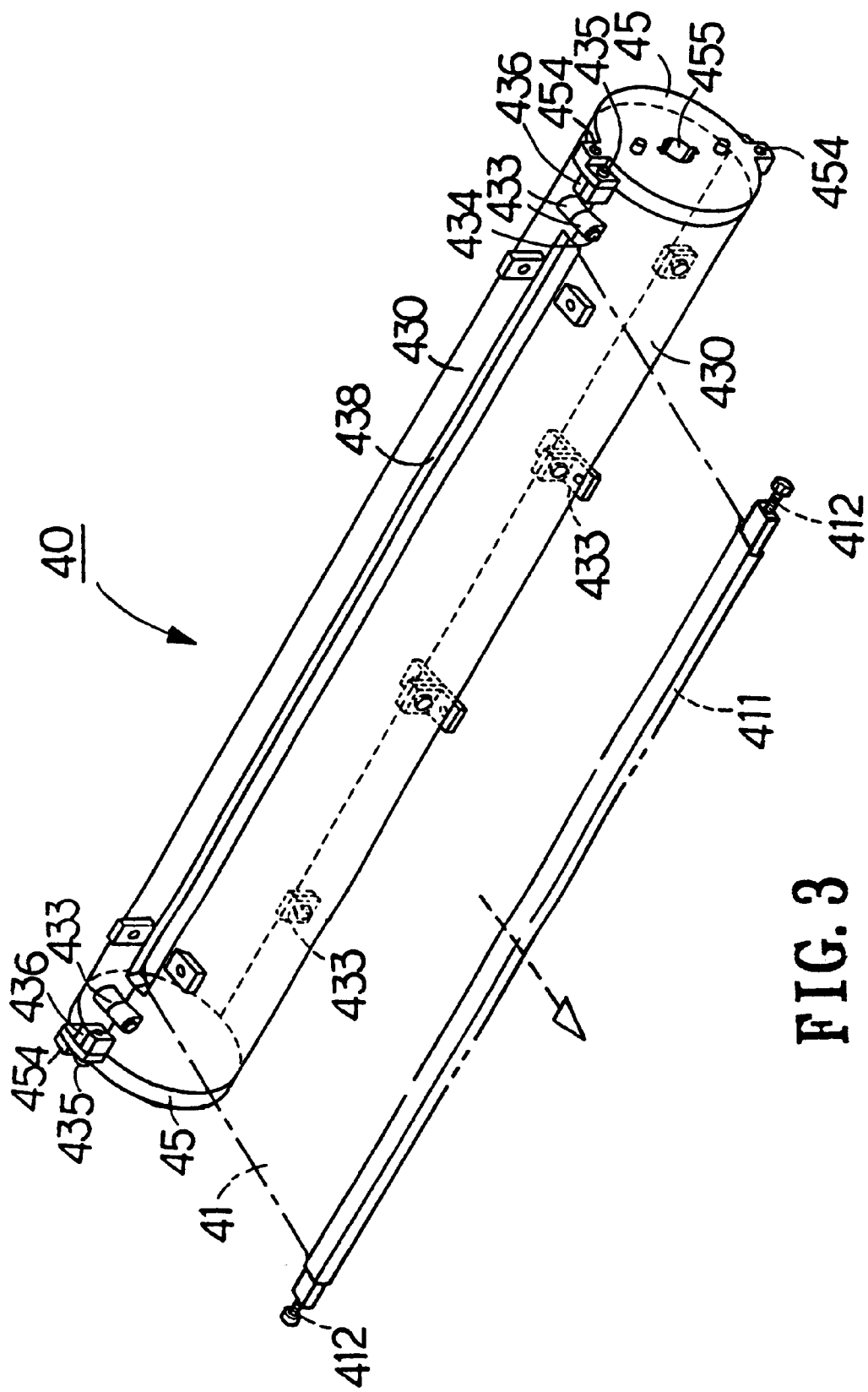
FIG. 3 is a perspective view of the reel.
Figure 4:
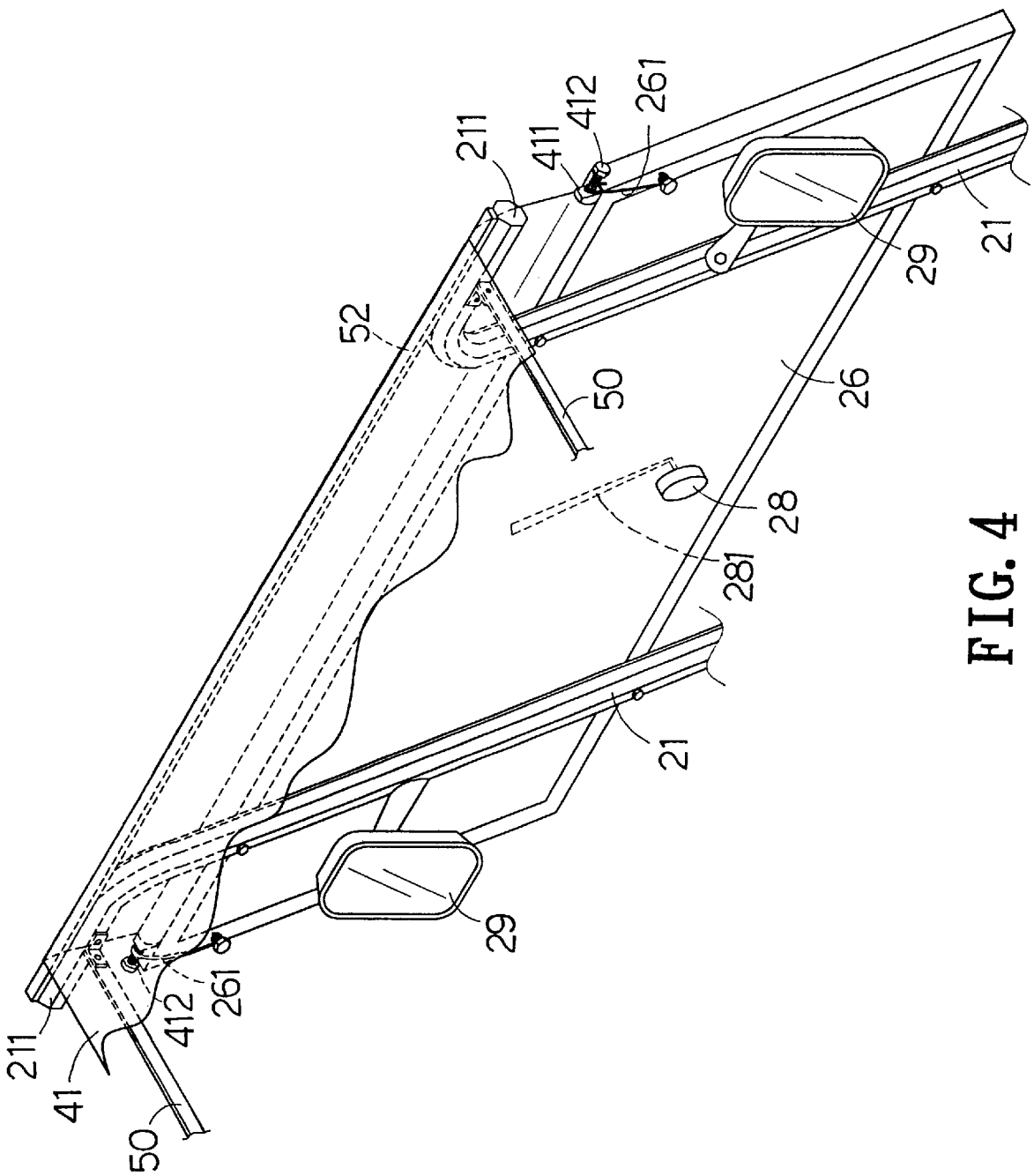
FIG. 4 illustrates the engagement between the canvas and the windshield.

FIG. 3 is perspective view of the reel. As shown, when the reel 40 is assembled, the canvas 41 can be pulled out of the slot 438 of the housing 43. The front edge of the canvas 41 is provided with a transverse rod 411 by means of which the canvas 41 can be pulled onto the windshield 26 (see FIG. 4) with hooks 261 at two sides of the windshield 26 engaged with screws 412 at two ends of the transverse rod 411 thus preventing the canvas 41 from going back into the reel 40. As the hooks 261 are released, the springs 44 will rotate the axle 42 to pull the canvas back into the reel 40.

Figure 5:
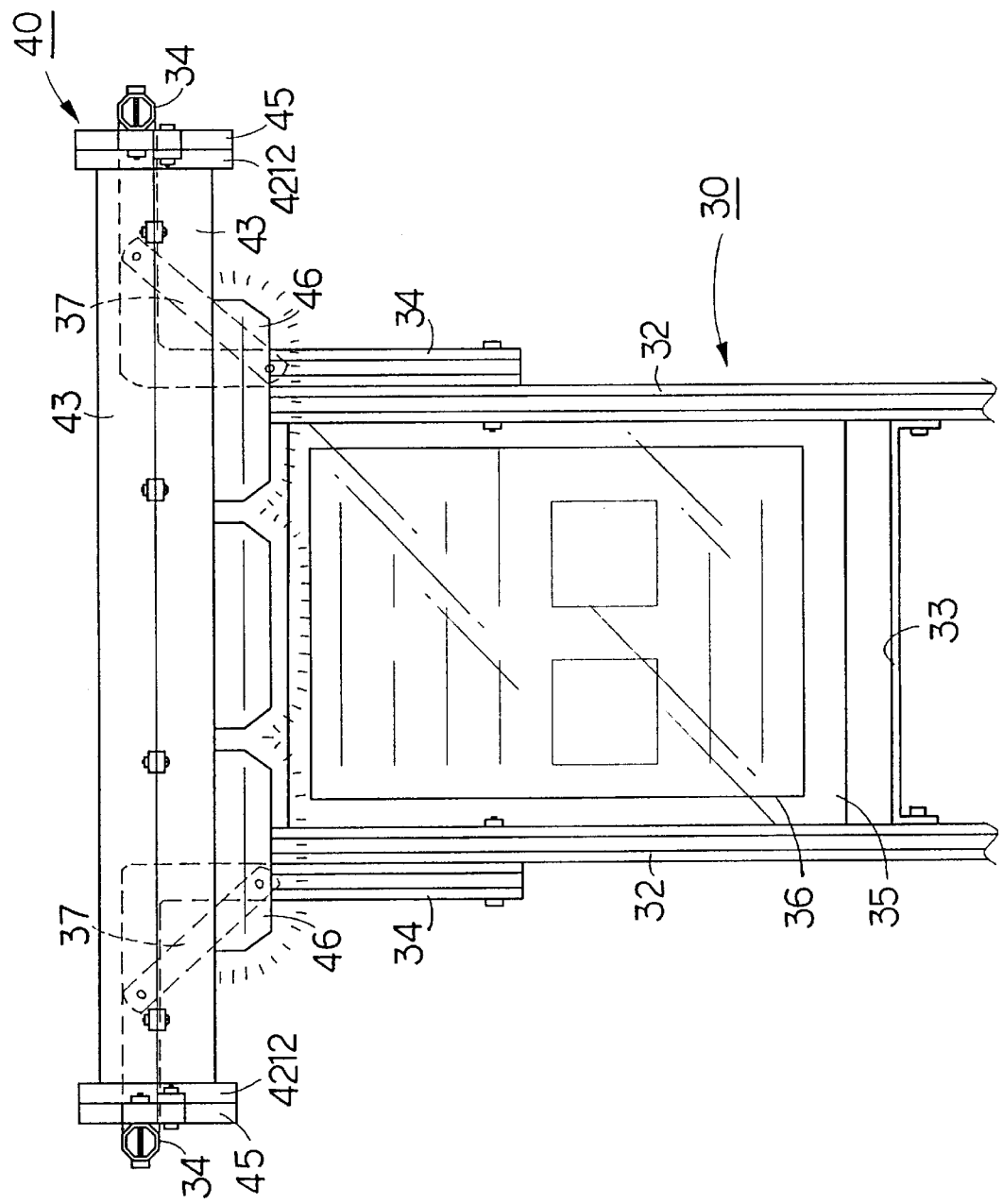
FIG. 5 illustrates the rear side of the rear brackets and reel supporting brackets.

FIG. 5 is a rear view of the rear brackets and the reel. As shown, an advertising board 35 is arranged between the two L-shaped rods 32 of the rear brackets 30 to be used for arranging advertisements or the like.

Figure 6:
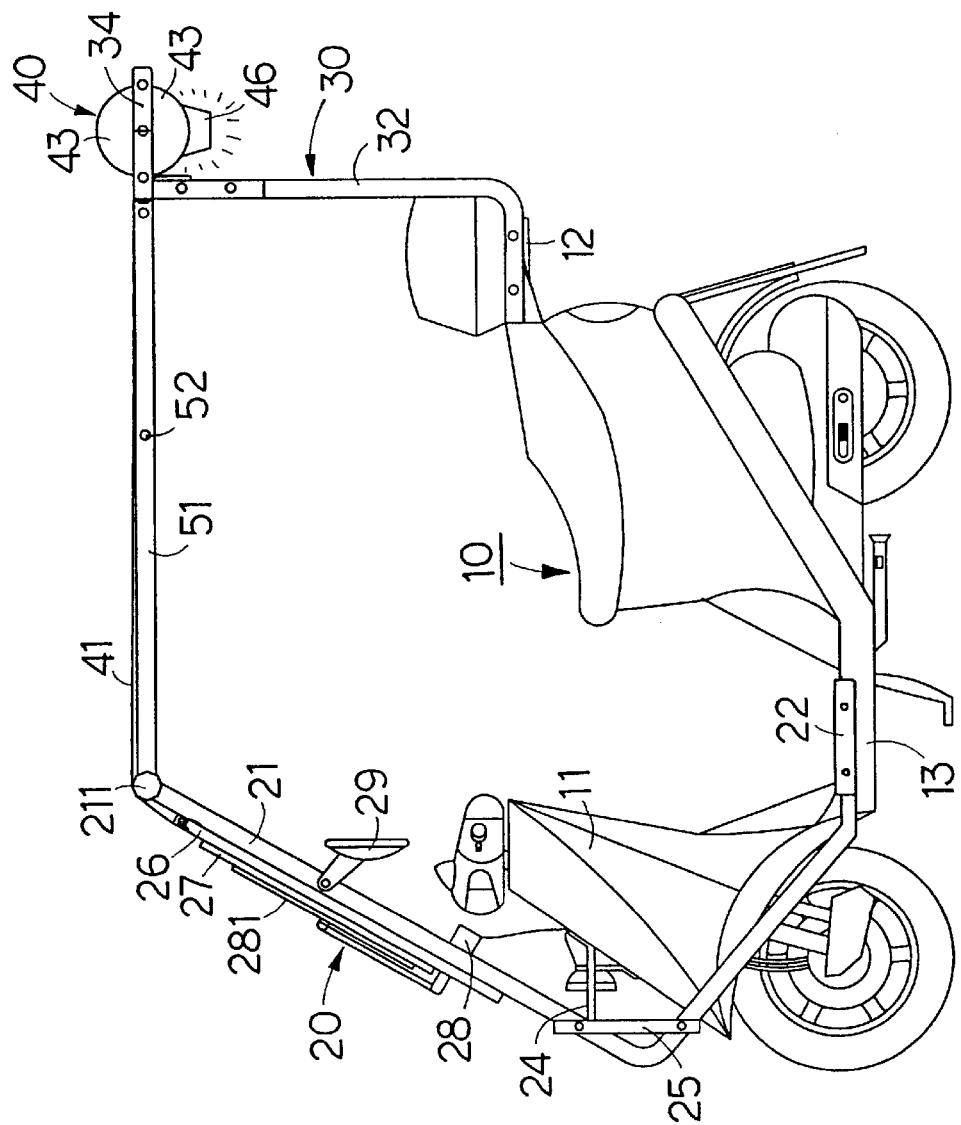
FIG. 6 is a side view of a scooter on which is mounted the sunshield according to the present invention.

FIG. 6 is a side view of a scooter provided with the sunshield according to the present invention. As shown, the upper portion of the front bracket 20 is arranged at an inclined position for reducing windage. In addition, the lamp hood 46 at the rear side of the reel 40 can be used as a braking and direction indicating light.

Figure 7:
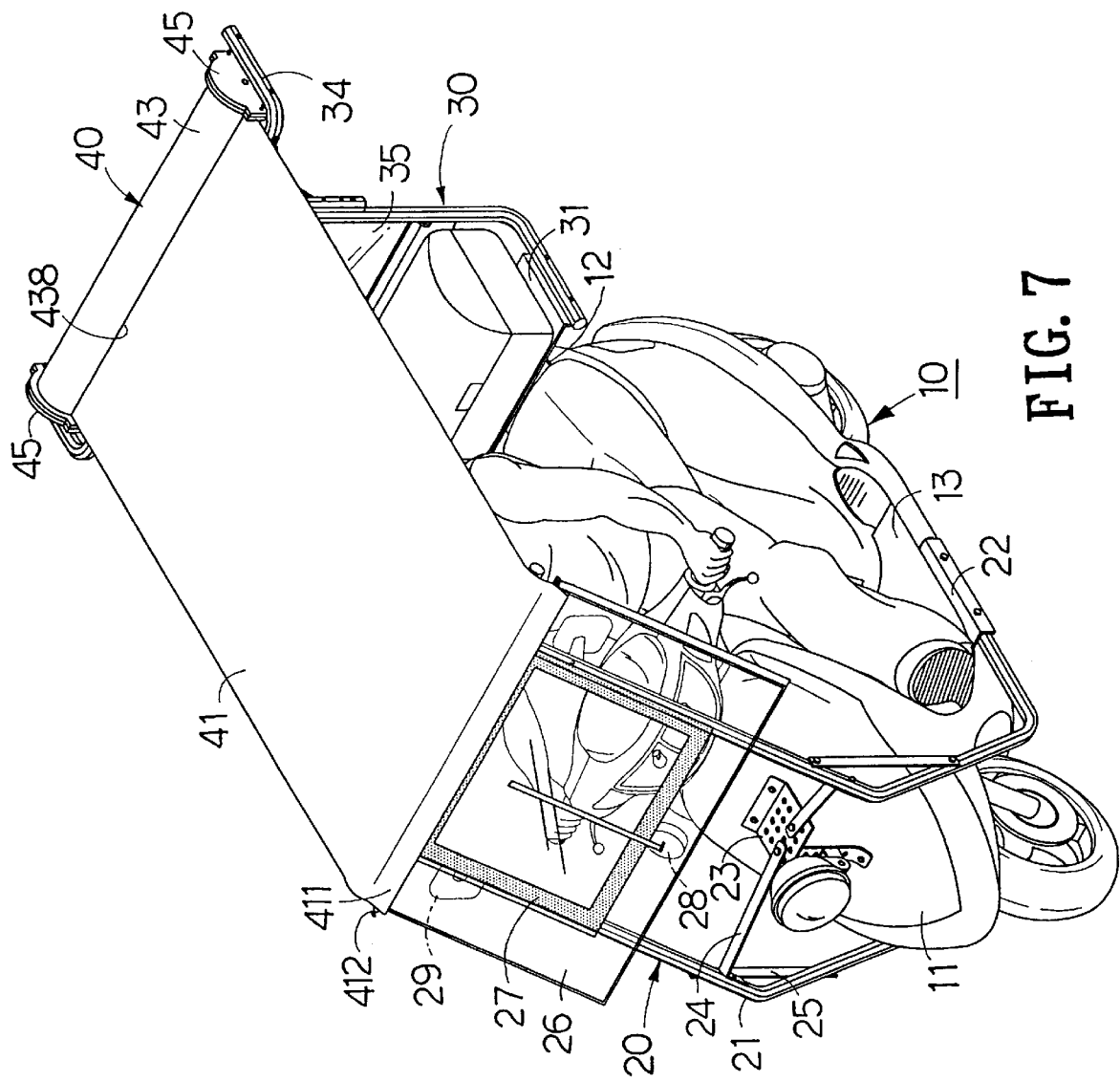
FIG. 7 is a working view of the present invention.

FIG. 7 is a working view of the present invention. As illustrated, the canvas 41 is pulled out of the reel 40 to cover the top of the frame 50 thereby blocking off direct sunlight and protecting a rider from rain.

Figure 8:
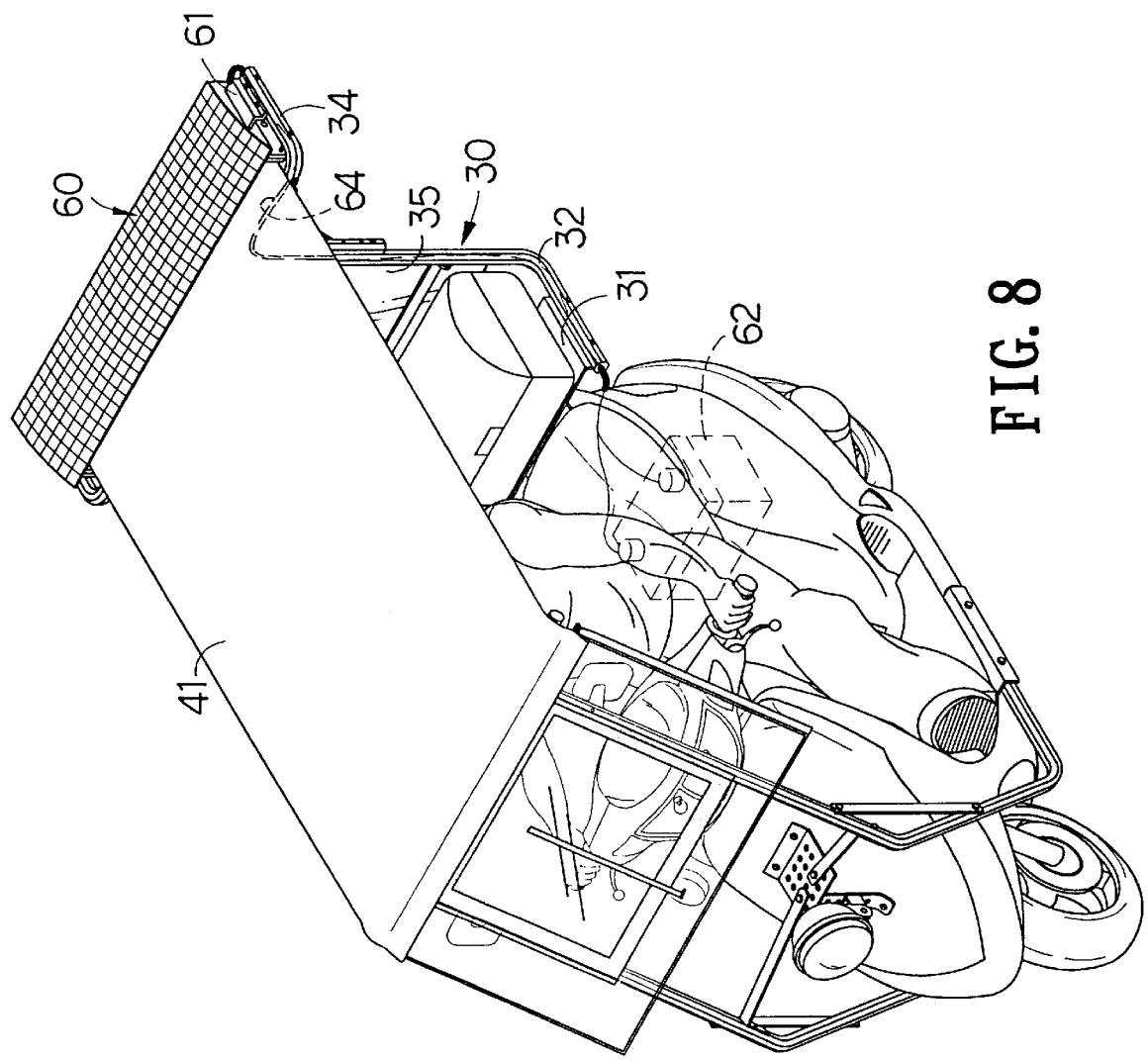
FIG. 8 illustrates a second preferred embodiment of the present invention.
Figure 9:
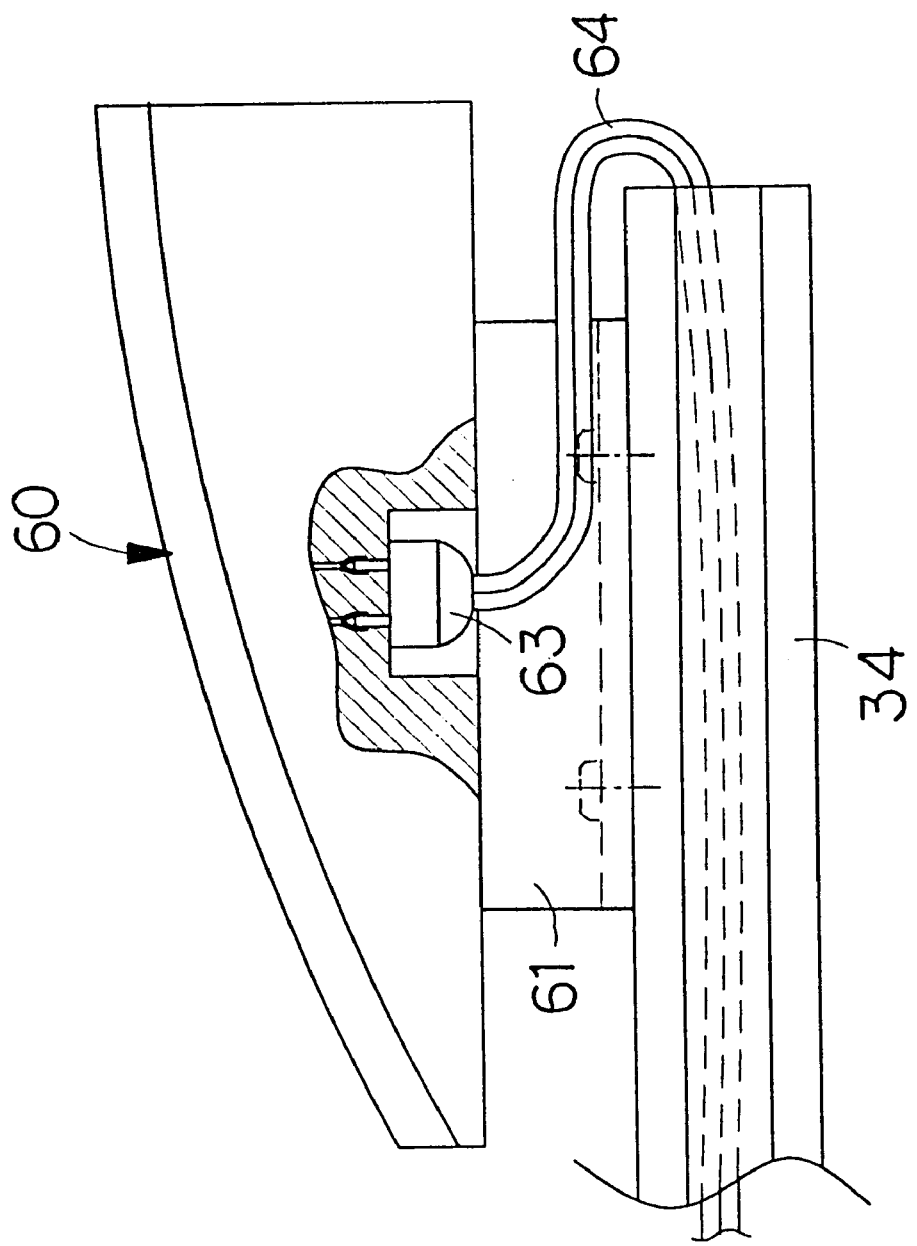
FIG. 9 is an enlarged sectional view of the solar energy collecting panel.

FIG. 8 is another working view of the present invention. As shown, a solar energy storage device 60 is mounted on the reel supporting brackets 34 by two brackets 61. The bottom of the solar energy storage device 60 may be provided with a plug 63 (see FIG. 9) which is connected to secondary cells 62 by electrical cables 64, so that the solar energy may be converted into electric power which is in turn storaged in the secondary cells for providing power for starting and driving the scooter.

Figure 10:
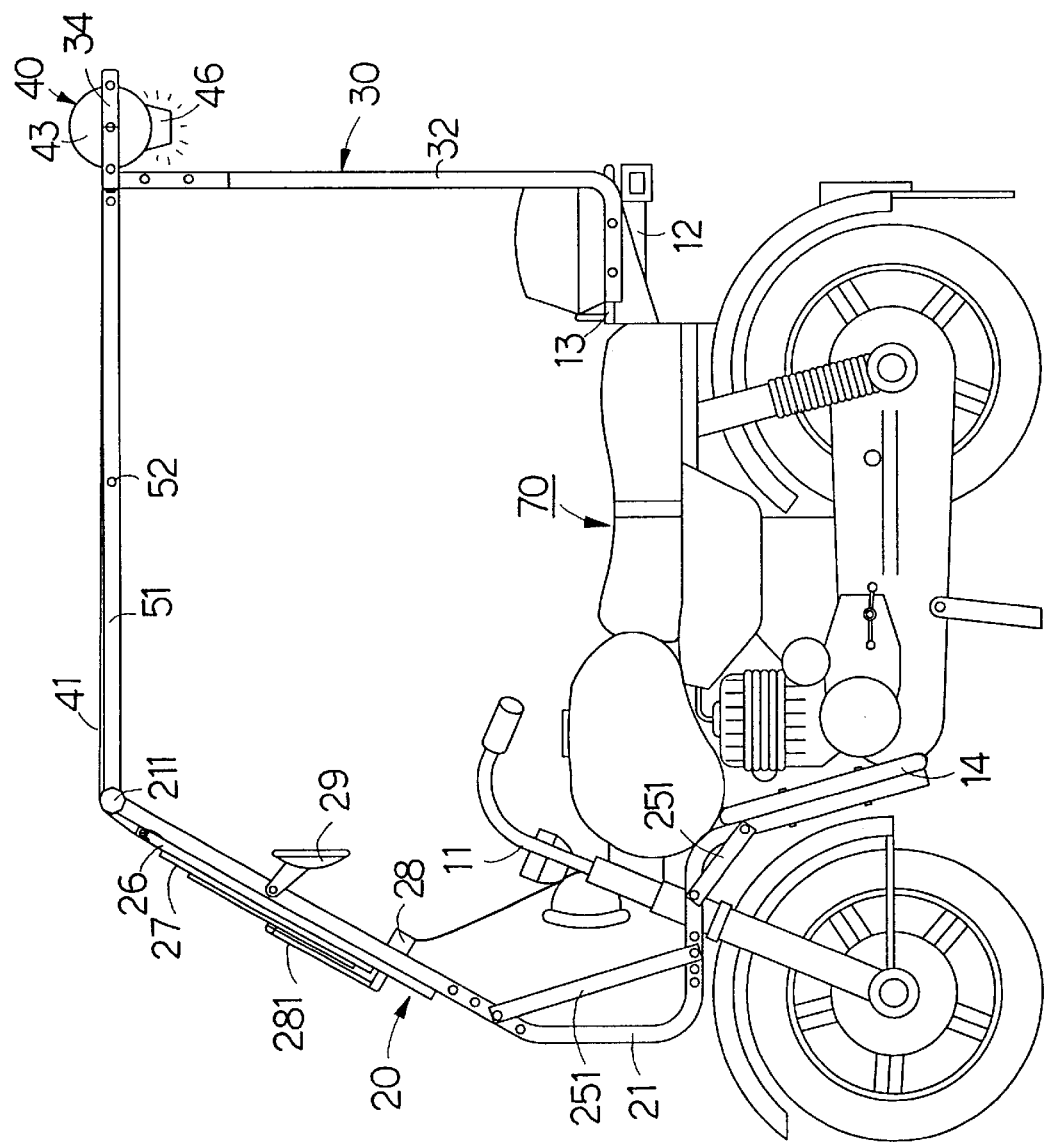
FIG. 10 is a side view of a motorcycle on which is mounted the sunshield according to the present invention.

FIG. 10 illustrates an application of the present invention to a motorcycle. As shown, except the front brackets 20, the structure of the sunshield shown in FIG. 10 is almost the same as that shown in FIG. 1. The lower end of the main rod 21 of the front bracket 20 is fixedly mounted on the outer side of the front rack 14 of the motorcycle 70 and the corner of the main rod 21 is provided with a rod 251 for reinforcing the structure thereof.

Figure 11:
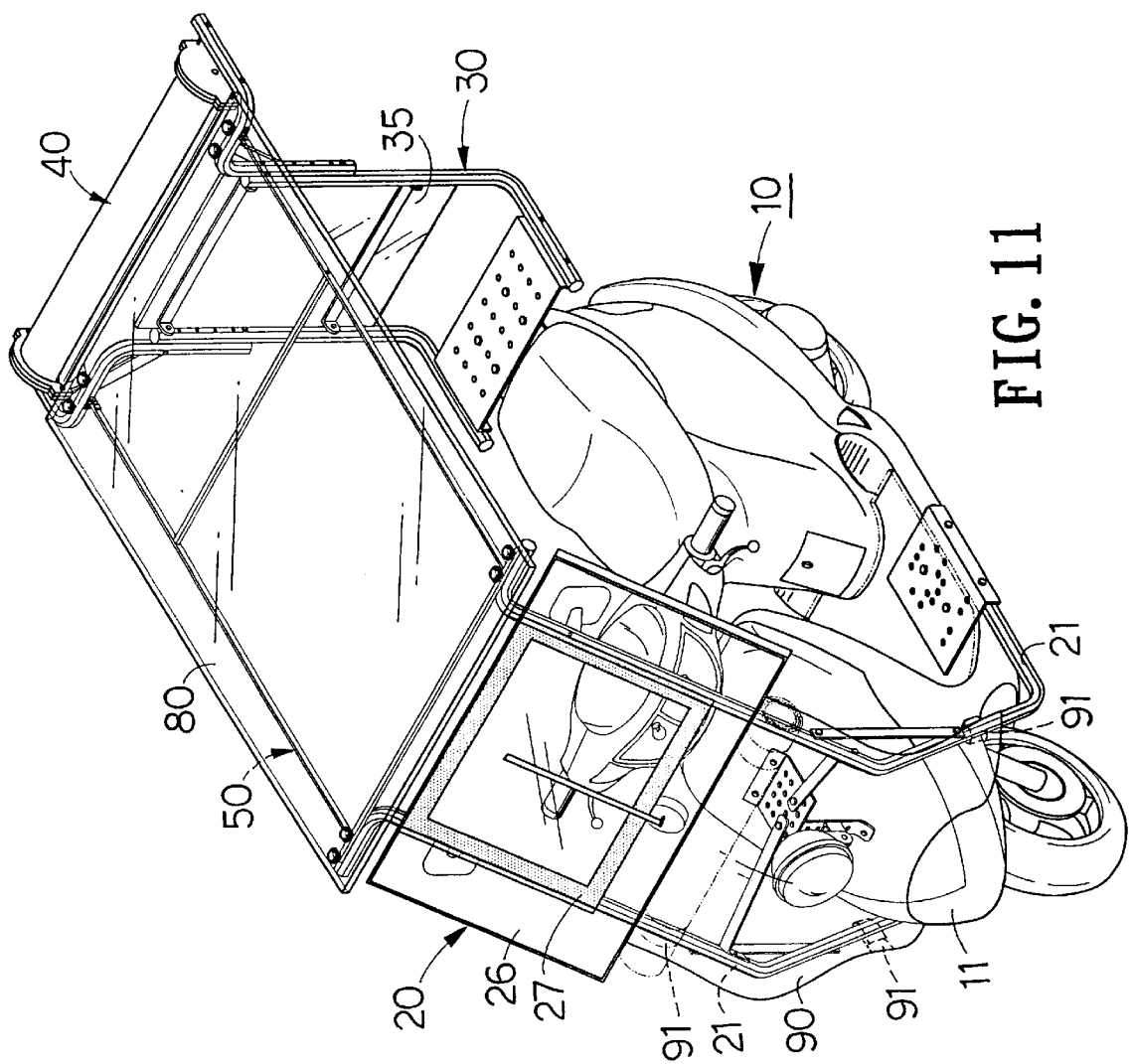
FIG. 11 illustrates another preferred embodiment of the present invention.

Referring to FIG. 11, a transparent board 80 is mounted on the front and rear brackets 20 and 30 for protecting a rider from rain. When desired to block off direct sunlight, it is only necessary to pull the canvas 41 out to cover the transparent board 80. Furthermore, a cloth 90 is arranged on the head portion 11 for keeping the rider from rain, which can be conveniently rolled up and tied by two straps 91 when not in use.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

I claim:

1. A sunshield mounted to a motorcycle comprising:
   a pair of front brackets mounted on two sides of of a head portion of a motorcycle;
   a pair of rear brackets mounted on a tail portion of said motorcycle;

a pair of reel supporting brackets fixedly mounted on said rear brackets;

a reel installed on said reel supporting brackets and provided with a piece of canvas, said reel including a housing, a tubular shaft disposed within said housing, a positioning rod fitted within said tubular shaft, said piece of canvas having an edge fastened on said positioning rod, a pair of caps configured to engage with two ends of said housing, and two spiral springs each having an outer end engaged with one of said cap and an inner end engaged with said tubular shaft;

a frame arranged between said front and rear brackets and composed of two longitudinal rods and two transverse rods;

a transparent windshield fixedly mounted on an upper portion of said front brackets; and a pair of rearview mirrors each mounted on said upper portion of said front brackets;

whereby said canvas can be pulled out of said reel to engage with upper ends of said front brackets to protect a rider of a motorcycle from strong wind, direct sunlight and rain.

2. The sunshield for motorcycles as claimed in claim 1, wherein said reel is provided with warning lights.

3. The sunshield for motorcycles as claimed in claim 1, wherein said reel is provided with a solar energy collecting panel.

4. The sunshield for motorcycles as claimed in claim 1, further comprising a piece of reinforced glass mounted on said windshield.

5. The sunshield for motorcycles as claimed in claim 1, further comprising a board vertically arranged between said rear brackets.

6. The sunshield for motorcycles as claimed in claim 1, further comprising a top board installed on a top of said frame.

7. The sunshield for motorcycles as claimed in claim 1, further comprising a cloth mounted on a head portion of said motorcycle and can be rolled up and tied by two straps.

* * * * *